United States Patent [19]

Yamada et al.

[11] Patent Number: 4,882,755

[45] Date of Patent: Nov. 21, 1989

[54] SPEECH RECOGNITION SYSTEM WHICH AVOIDS AMBIGUITY WHEN MATCHING FREQUENCY SPECTRA BY EMPLOYING AN ADDITIONAL VERBAL FEATURE

[75] Inventors: Youichi Yamada; Keiko Takahashi, both of Tokyo, Japan

[73] Assignee: Oki Electric Industry Co., Ltd., Tokyo, Japan

[21] Appl. No.: 84,107

[22] Filed: Aug. 11, 1987

[30] Foreign Application Priority Data

Aug. 21, 1986 [JP] Japan ................................. 61-196272
Aug. 21, 1986 [JP] Japan ................................. 61-196274
Sep. 5, 1986 [JP] Japan ................................. 61-208978

[51] Int. Cl.⁴ .............................................. G10L 7/08
[52] U.S. Cl. ....................................... 381/41; 381/43
[58] Field of Search ................................ 381/41-50; 364/513.5

[56] References Cited

U.S. PATENT DOCUMENTS

| | | | |
|---|---|---|---|
| 3,582,559 | 6/1971 | Hitchcock | 381/43 |
| 4,370,521 | 1/1983 | Johnston et al. | 381/41 |
| 4,403,114 | 9/1983 | Sakoe | 381/42 |
| 4,677,673 | 6/1987 | Ukita et al. | 381/43 |
| 4,716,593 | 12/1987 | Hirai et al. | 381/43 |

OTHER PUBLICATIONS

Iizuka, "Speaker Independent Telephone Speech Recognition", IEEE, 1985, pp. 842-845.

*Primary Examiner*—Gary V. Harcom
*Attorney, Agent, or Firm*—Spencer & Frank

[57] ABSTRACT

In a speech recognition system using normalized spectrum matching, a second feature pattern is calculated and compared with reference patterns. The similarity obtained as a result of the comparison is used to determine overall similarity, from which the recognition is made. The second feature pattern can be a spectrum variation pattern, a level decrease pattern, or a spectrum relative value pattern.

9 Claims, 17 Drawing Sheets

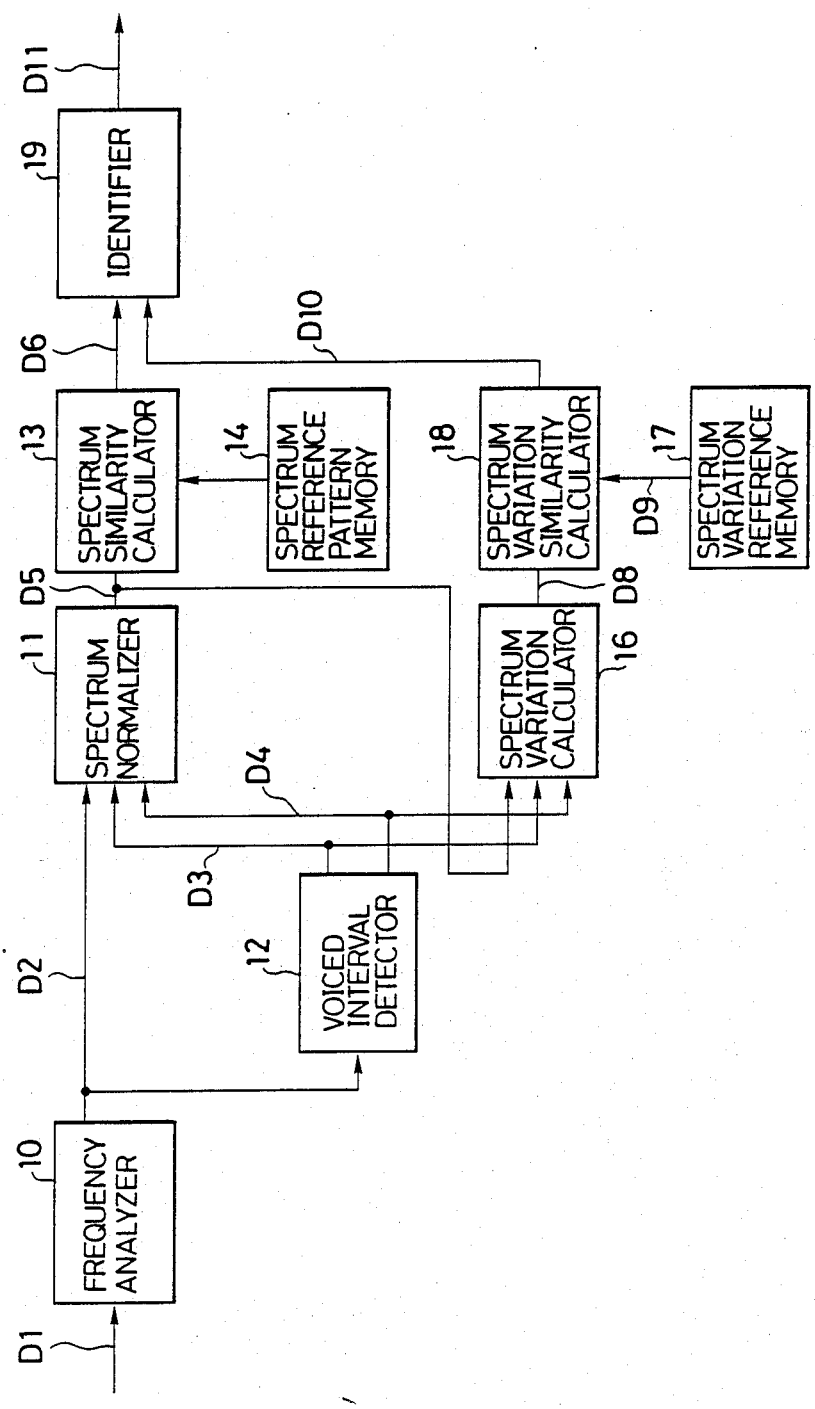

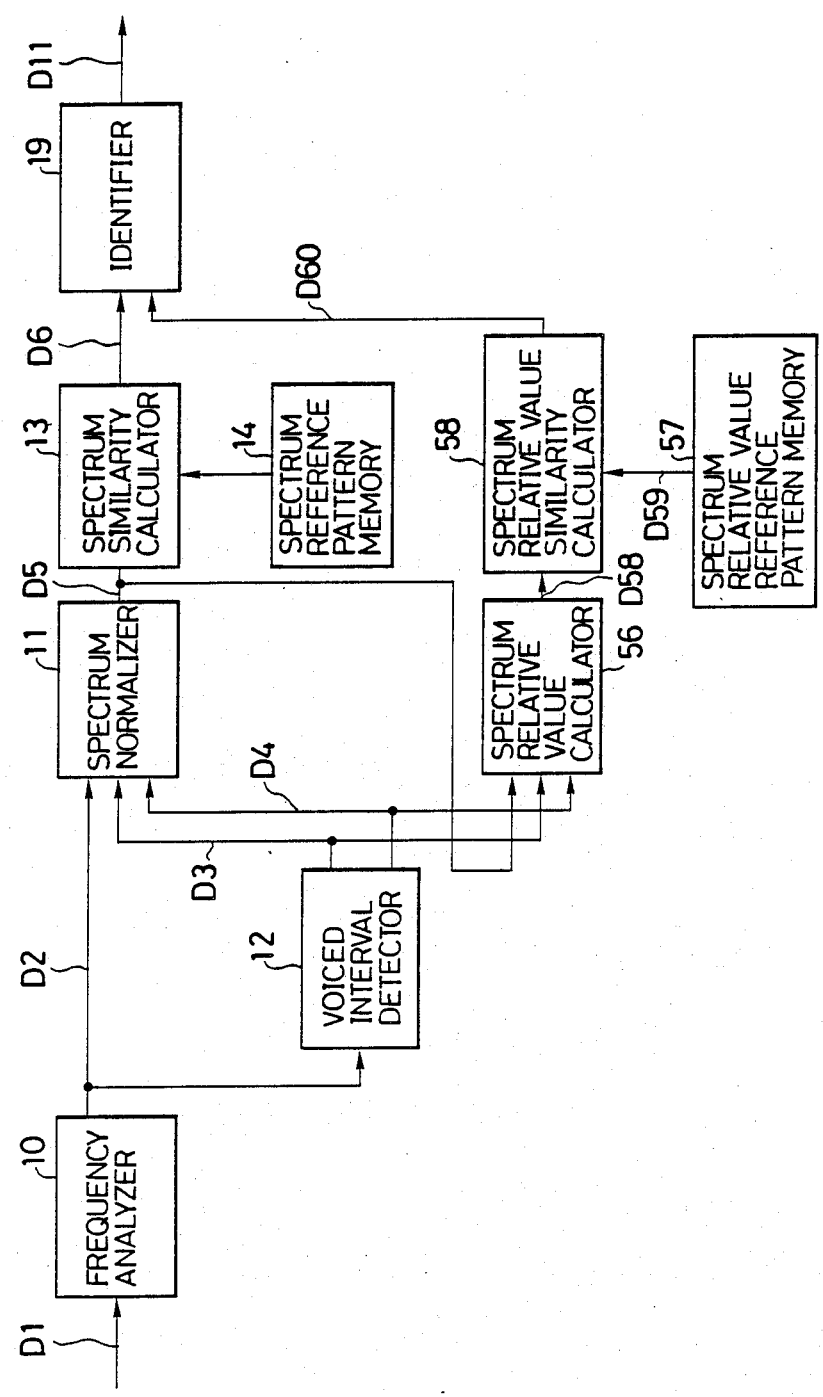

SPEECH RECOGNITION SYSTEM WHICH AVOIDS AMBIGUITY WHEN MATCHING FREQUENCY SPECTRA BY EMPLOYING AN ADDITIONAL VERBAL FEATURE

BACKGROUND OF THE INVENTION

This invention relates to a speech recognition system and in particular to a speech recognition system using matching techniques.

A speech recognition system using a spectrum matching technique which has been proposed previously will first be described below with reference to FIG. 1, FIG. 2A and FIG. 2B.

Input speech signals D1 which have undergone analog to digital conversion are input to frequency analyzer 10. Frequency analyzer 10 analyzes the frequencies of input signals D1 by means of band pass filters with differing center frequencies (center frequency numbers are hereinafter referred to as channels) and calculates (FIG. 2A) frequency spectrum D2, which has undergone logarithmic conversion, for each fixed time interval (hereinafter referred to as frame). Frequency spectrum D2 is output to spectrum normalizer 11 and to voiced interval detector 12.

From the values of frequency spectrum D2, voiced interval detector 12 determines the start point and the end point, outputting start point signal D3 and end point signal D4 to spectrum normalizer 11.

Spectrum normalizer 11 obtains the normalized spectrum by subtracting the least square fit line for the spectrum from frequency spectrum D2 for each of the frames from the start point to end point (see FIG. 2B), outputting this as normalized spectrum pattern D5 to spectrum similarity calculator 13.

The process described above is repeated for each fixed time interval from the speech start point to the speech end point.

Next, spectrum similarity calculator 13 calculates the similarity between normalized spectrum D5 and each of the reference patterns which have been stored in spectrum reference pattern memory 14, and outputs the spectrum similarity D6 for each recognition category to an identifier 15.

The recognition result output by identifier 15 is the name of the category which contains the reference pattern which gives the largest similarity of all the reference patterns.

The spectrum matching technique in the speech recognition system described above allows differences in vocal chord source characteristics produced by differences between speakers to be absorbed, and is effective in recognizing speech produced by an unspecified speaker.

The above spectrum matching technique extracts the shape of the spectrum for the whole input speech pattern and calculates its similarity with the spectrum reference pattern.

This spectrum matching technique, however, has the following problem. Let us consider categories whose whole patterns have similar shapes of the spectrum, for instance "iie" and "rei" (which are words in the Japanese language). Although there is a clear difference in the positions of the formant frequencies of vowel "i" and vowel "e" within the same utterance, there are parts where the distribution of the positions of the formant frequencies of the two vowels overlap between utterances at different occasions and by different speakers. Therefore when determining the similarity of the utterance with the spectrum reference pattern, which is a standard value for the normalized spectrum information (for instance, formant frequency), it is difficult to accurately distinguish these two vowels. That is to say, there is a problem in that recognition performance is low.

Another problem associated with the prior art spectrum matching is as follows. Let us consider categories whose whole patterns have similar shapes of the spectrum, for instance "ichi" and "ni" (the words for "one" and "two" in Japanese). Although there is a clear difference in that the former has a voiceless period between "i" and "chi" and the latter does not have such a voiceless period, the shapes of the spectrums at the steady vowel parts are similar to each other. If the normalized spectrum output for the voiceless peroid before "chi" of "ichi" (the peroid in which the input signal level is about the same as the background noise and the normalized spectrum output is about the same as the background noise spectrum) is similar to that of "ni", it is difficult to distinguish these two words.

SUMMARY OF THE INVENTION

An object of the invention is to solve the problem stated above.

Another object of the invention is to provide a speech recognition system having a superior recognition performace.

According to the invention, there is provided a speech recognition system comprising a frequency analyzer which performs frequency analysis of the input speech into a number of channels, performs logarithmic conversion and extracts a frequency spectrum, a voiced interval detector which detects voiced intervals on the basis of the said frequency spectrum, a spectrum normalizer which calculates the normalized spectrum pattern obtained by normalizing the vocal chord source characteristics with respect to the said frequency spectrum on the basis of the said frequency spectrum and voiced intervals, a spectrum reference pattern memory in which spectrum reference patterns are stored in advance, a spectrum similarity calculator which calculates the similarity between the said normalized spectrum pattern and spectrum reference pattern for each of recognition categories, and an identifier which, as the result of spectrum similarity calculation, outputs the name of the recognition category which has the highest similarity, the speech recognition system further comprising:
(a) a second feature pattern calculator which calculates a second feature pattern,
(b) a second feature reference pattern memory in which second feature reference patterns have previously been stored, and
(c) a second feature similarity calculator which calculates the similarity between the said second feature pattern and second feature reference patterns with respect to each recognition category, and in that
(d) in the identifier, the overall similarity is calculated for each of the recognition categories by reference to both the similarity of the spectrum and the similarity of the second feature, and the category giving the largest overall similarity is output as the recognition result.

In this way, speech recognition is performed using an overall similarity with the addition of the similarity for the second feature considering the transition direction of the spectrum, making accurate and stable recognition possible.

BRIEF DESCRIPTION OF THE DRAWINGS

FIG. 3 is a functional block digram showing an embodiment of the speech recognition system according to the invention.

FIG. 13 is a block diagram showing a third embodiment of the invention.

DETAILED DESCRIPTION OF THE PREFERRED EMBODIMENTS

Figure 1:
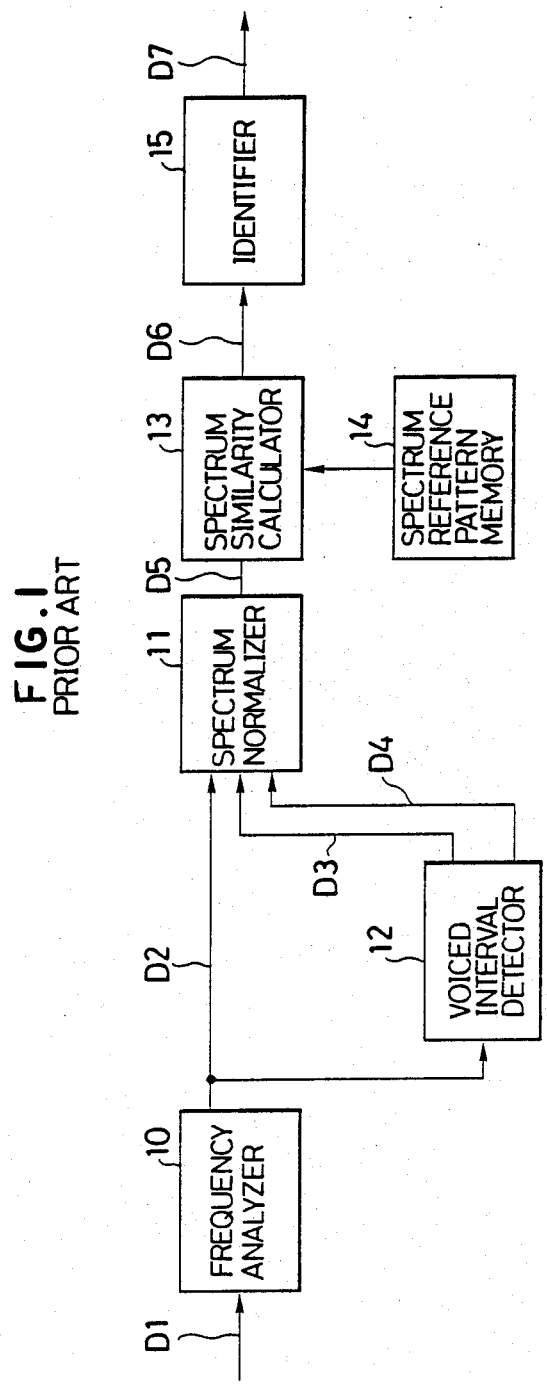
FIG. 1 is a functional block diagram showing a prior art speech recognition system.
Figure 2A:
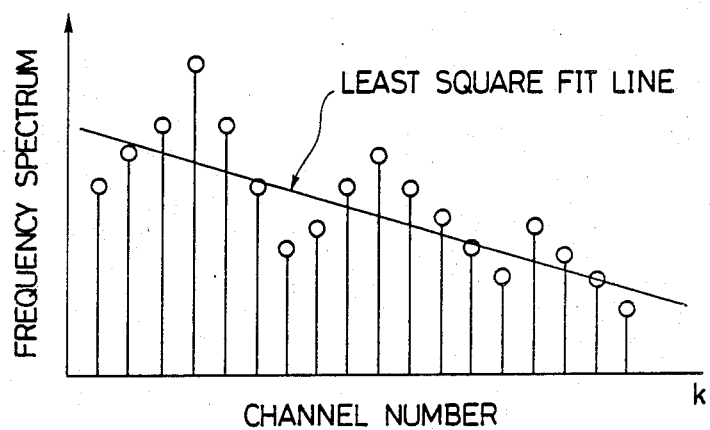
FIG. 2A is a diagram showing the least square fit line which gives the vocal cords source characteristics.
Figure 2B:
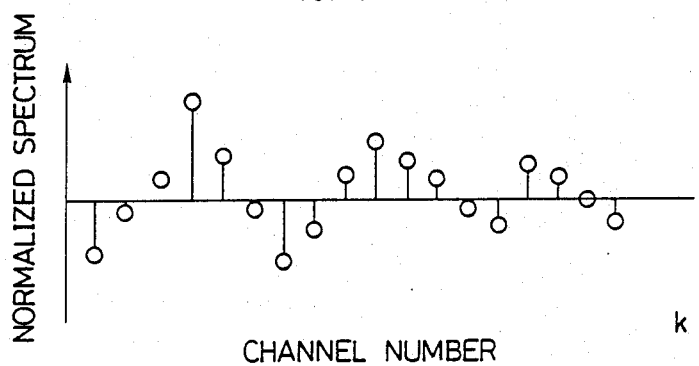
FIG. 2B is a diagram showing the normalized spectrum.

FIG. 3 shows an embodiment of a speech recognition system in accordance with the present invention. In this embodiment, spectrum variation is taken as a second feature value or characteristic of spoken words, along with spectrum similarity, and the similarity in spectrum variation is taken into consideration in making the overall similarity calculation. In FIG. 3, the components having identical or similar functions to those in FIG. 1 are denoted by identical reference numerals.

In addition to the structural components described above with reference to FIG. 1, the speech recognition system of this embodiment comprises a spectrum variation calculator 16 which extracts the spectrum variation, a characteristic of an utterance, a spectrum variation reference pattern memory 17 which stores spectrum variation reference patterns in advance in a manner such that can be read out freely, a spectrum variation similarity calculator 18 which calculates the similarity of spectrum variation patterns and spectrum variation reference patterns, and an identifier 19 which can recognize sounds using the overall similarity.

The spectrum variation calculator 16 is supplied with shart point signal D3 and end point signal D4 from voiced interval detector 12, and is also supplied with normalized spectrum pattern D5 from spectrum normalizer 11. Spectrum variation calculator 16 uses a method described below as part of the explanation of FIG. 5 to calculate spectrum variation pattern D8, which is then output to spectrum variation similarity calculator 18.

The spectrum variation similarity calculator 18 calculates the similarity from spectrum variation pattern D8 and each of the spectrum variation reference patterns D9 stored in spectrum variation reference pattern memory 17, and then outputs to identifier 19 the similarity of spectrum variation D10 for each recognition category.

The identifier 19 obtains the largest overall similarity by reference to both the spectrum similarity D6 for each recognition category and the spectrum variation similarity D10, and outputs recognition result D11. In this embodiment, the sum of the spectrum similarity D6 and spectrum variation similarity D10 is calculated, and the name of the recognition category which gives the largest of the values for the total similarity is output as recognition result D11.

Next, the operations of spectrum variation calculator 16 will be described with reference to the function block diagram of FIG. 4 and the flow chart FIG. 5.

Figure 4:
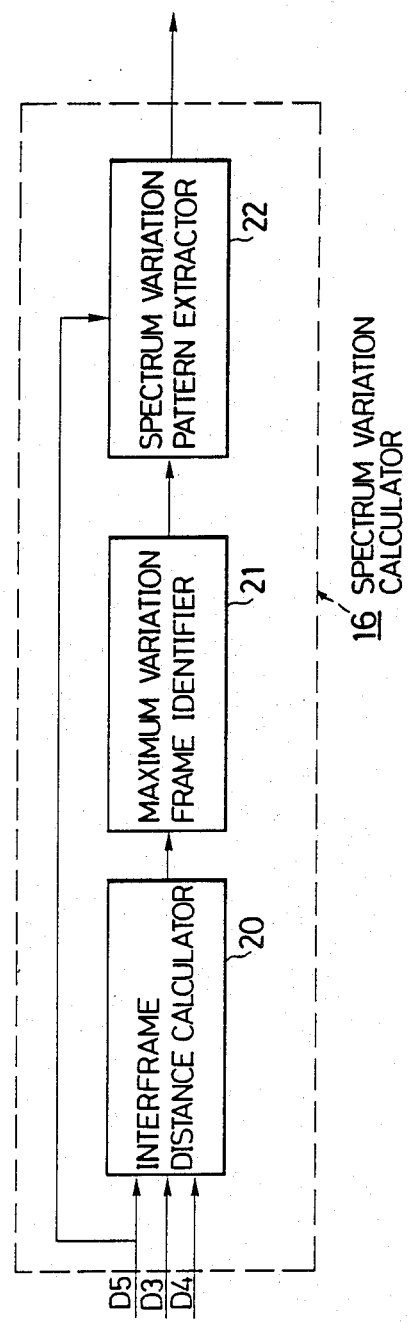
FIG. 4 is a functional block diagram showing an example of spectrum variation extractor forming a principal part of the invention.
Figure 5:
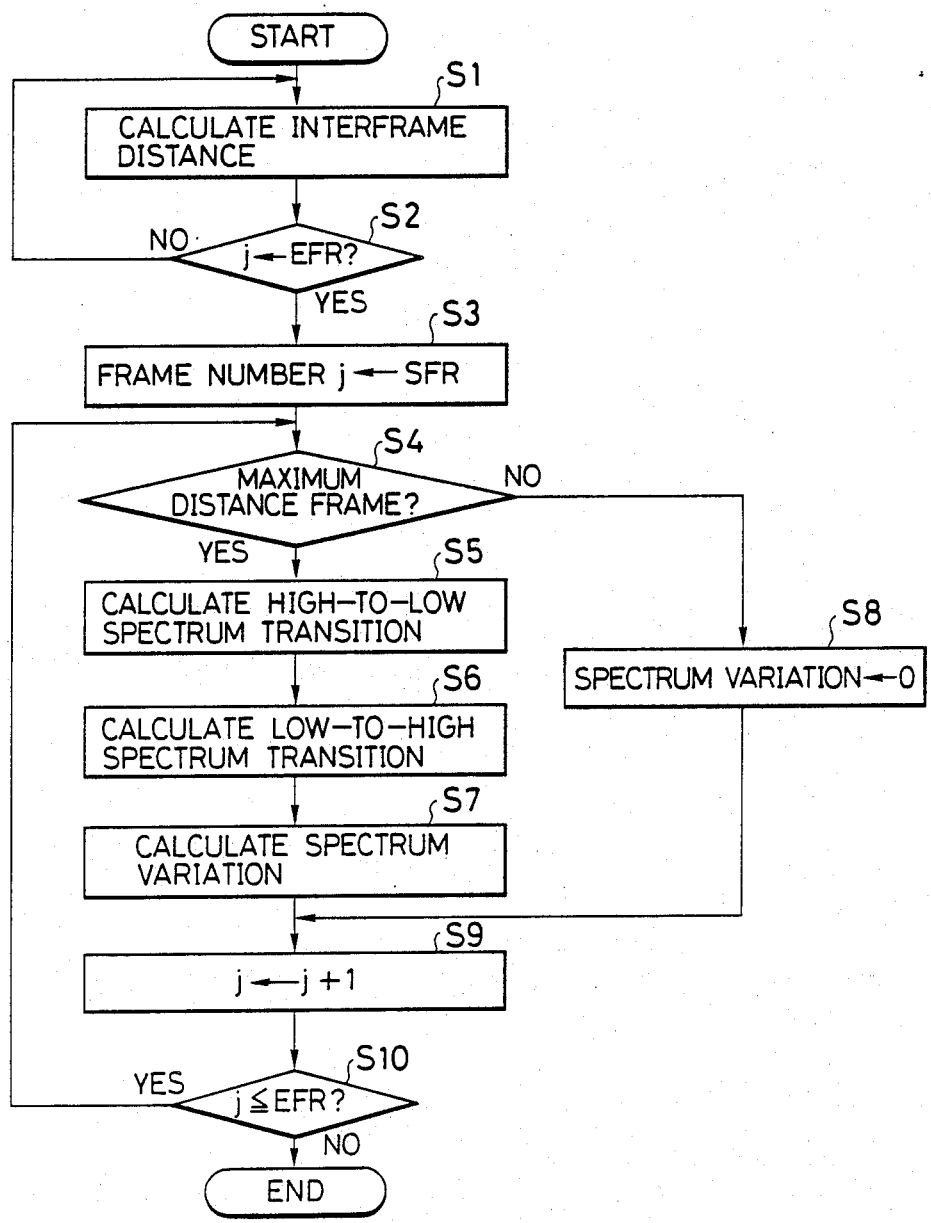
FIG. 5 is a flow chart to explain the operations in the spectrum variation extractor in FIG. 4A.

As can be seen from FIG. 4, in this embodiment, spectrum variation calculator 16 comprises an interframe distance calculator 20, a maximum variation frame identifier 21, and spectrum variation pattern extractor 22. The sequence of processing by components 20-22 will be described below with reference to FIG. 5. In the explanations below, a processing step is expressed by "S".

(A-I) INTERFRAME DISTANCE CALCULATOR 20

For a given frame (frame number j) within a voiced interval, the interframe distance is denoted by DST(j), the number of frequency analysis channels is denoted by CHNNO, and the normalized spectrum output is denoted by SPEC (i,j) (where i is the channel number). First of all, the difference $\Delta$SPEC (i,j) in the normalized spectrum output between adjacent frames is obtained, and next, its absolute value $|\Delta$SPEC (i,j)$|$ is obtained, and then DST(j) is obtained by equation (1) below (S1).

$$DST(j) = \sum_{i=1}^{CHNNO} |SPEC(i,j) - SPEC(i,j-1)| \quad (1)$$

In other words, as shown in equation (1), DST(j) is calculated for every frame in a voiced interval, from the start point frame SFR to the end point frame EFR, as the sum of the differences in absolute value for each channel component between the normalized spectrum output for the frame in question and the normalized spectrum output for the frame preceding the frame in question.

(A-II) MAXIMUM VARIATION FRAME IDENTIFIER 21

After initially setting frame number j=SFR (S3), it is determined by comparison whether or not the interframe distance DST(j), calculated for each frame in the voiced interval, is a maximum (S4), thereby detecting a frame where DST(j) is at a maximum as a maximum variation frame.

(A-III) SPECTRUM VARIATION PATTERN EXTRACTOR 22

(i) For a maximum variation frame (S5-S7)

(a) Calculation of spectrum transition scores from a high region to a low region (S5)

For each channel, the spectrum transition score HTOL(i,j) (i: channel number) from a high region to a low region around the corresponding maximum variation frame is calculated by means of equation (2) below.

$$HTOL(i,j) = \sum_{t=j-TL}^{j-1} \sum_{f=i+1}^{i+FL} SPEC(f,t) + \sum_{t=j+1}^{j+TL} \sum_{f=i-FL}^{i-1} SPEC(f,t) \quad (2)$$

The first item in equation (2) is the normalized spectrum transition score for the region on the negative side of the frame number and on the positive side of the channel number, and the second item in equation (2) is the normalized spectrum transition score for the region on the positive side of the frame number and on the negative side of the channel number.

(b) Calculation of spectrum transition scores from a low region to a high region (S6)

For each channel, the spectrum transition score LTOH(i,j) (i: channel number) from a low region to a high region around the corresponding maximum variation frame is calculated by means of equation (3) below.

$$LTOH(i,j) = \sum_{t=j-TL}^{j-1} \sum_{f=i-FL}^{i-1} SPEC(f,t) + \sum_{t=j+1}^{j+TL} \sum_{f=i+1}^{i+FL} SPEC(f,t) \quad (3)$$

The first item in equation (3) is the normalized spectrum transition score for the region on the negative side of the frame number and on the negative side of the channel number, and the second item in equation (3) is the normalized spectrum transition score for the region on the positive side of the frame number and on the positive side of the channel number.

In equations (2) and (3), f is a variable representing the channel number, t is a variable representing the frame number, and TL and FL are specific constants determined by experience. In this embodiment, it is preferable that TL=3 and FL=2. The procedure for making calculations using equation (2) and equation (3) may be selected as required.

The value given by equation (2) above is the normalized spectrum transition score which represents the degree of transition from a high region channel towards a low region channel with the progress of time around the channel in question and the frame in question, and the value given by equation (3) above is the normalized spectrum transition score which represents the degree of transition from a low region channel towards a high region channel with the progress of time around the channel in question and the frame in question.

(c) Spectrum variation calculation (S7)

As a value representing the relationship between the normalized spectrum transition scores given by equation (2) and equation (3), the spectrum variation pattern DS(i,j) (i: channel number) for each channel in the frame in question (frame number j), is defined in equation (4) below.

$$DS(i,j) = HTOL(i,j) - LTOH(i,j) \quad (4)$$

The calculation step in which spectrum variation pattern DS(i,j) is extracted is performed in process step (S7).

If the value for DS(i,j) obtained from equation (4) is positive, the normalized spectrum transition score from a high region channel towards a low region channel with the progress of time is larger. If the value obtained from equation (4) is negative, the normalized spectrum transition score from a low region channel towards a high region channel with the progress of time is larger.

(ii) For frames other than maximum variation frame (S8)

The processing in this case is also performed by the spectrum variation pattern extractor 22.

In this case the value of spectrum variation pattern DS(i,j) for each channel in the frame in question is taken to be 0 for every channel (S8).

When the processes described above (S4-S8) have been completed, the next step is to determine whether or not j<EFR (EFR: end point frame number)

is satisfied (S10). If this condition is satisfied, processing is repeated from step S4, but if it is not satisfied, processing stops.

Explanation of an example

Figure 6A:
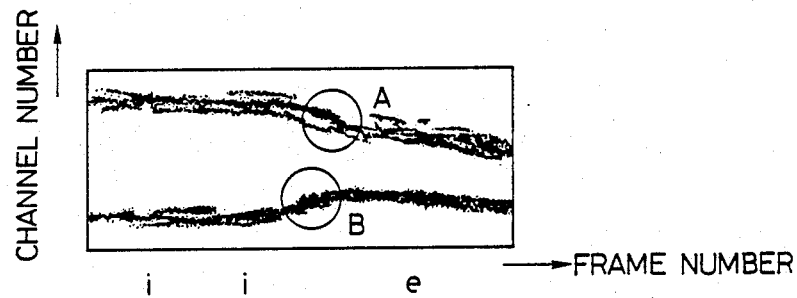
FIGS. 6A and 6B show normalized spectra for the utterance "iie" and "rei", respectively.
Figure 6B:
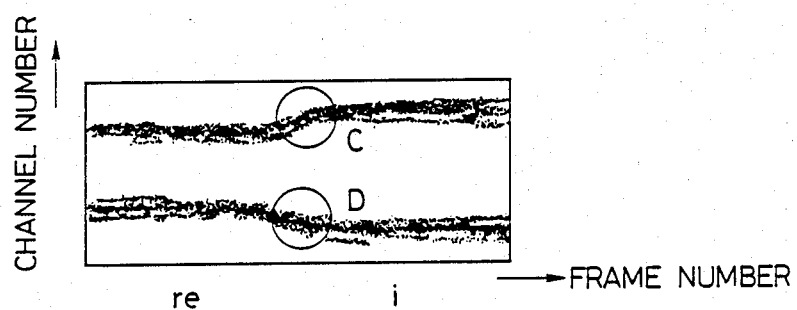

FIG. 6A shows the normalized spectrum for the utterance "iie", and FIG. 6B shows the normalized spectrum for the utterance "rei". In both FIGS. 6A and 6B, the horizontal axis represents the frame number and the vertical axis represents the channel number. Parts where the shading is dense represent a high normalized output value. The stronger the spectrum, the denser the shading. In the example illustrated, there is dense shading at both the top and bottom. This is because both the top and bottom parts of the spectrum (high frequency part, low frequency part) are strong.

As can be understood from these figures, region B shown in FIG. 6A and region C shown in FIG. 6B are regions where spectrum variation pattern DS(i,j) is negative, and region A shown in FIG. 6A and region D shown in FIG. 6B are regions where spectrum variation pattern DS(i,j) is positive. Consequently, the similarity of spectrum variation D10, which is the similarity between the spectrum variation pattern D8 output from spectrum variation calculator 16 and a spectrum variation reference pattern D9, shows a clear difference between "iie" and "rei".

Figure 7A:
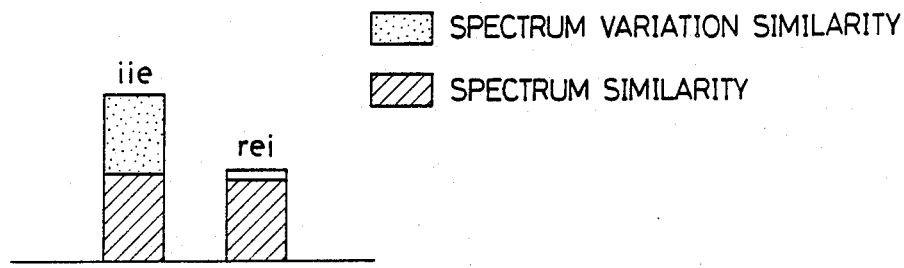
FIGS. 7A and 7B are explanatory diagrams of the overall similarity indicating the contribution of the spectrum variation patterns to recognition.
Figure 7B:
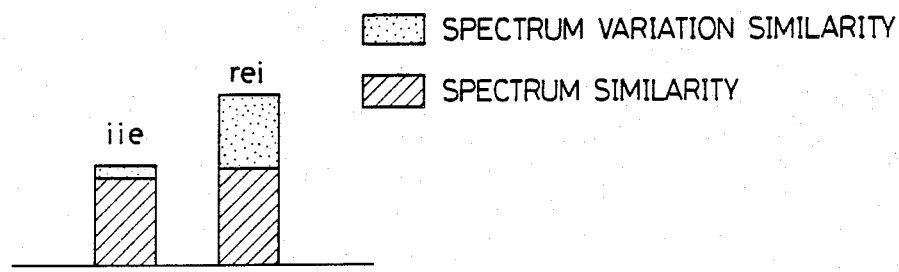

FIGS. 7A and 7B are explanatory diagrams of the overall similarity, which indicates the contribution of the spectrum variation patterns to recognition. FIG. 7A shows the overall similarity of the utterance "iie", which has the speech pattern given in FIG. 6A with respect to reference patterns of the categories "iie" and "rei". FIG. 7B indicates the overall similarity of the utterance "rei", which has the speech pattern given in FIG. 6B, with respect to reference patterns of the categories "iie" and "rei". In these diagrams, the parts marked with slanted lines indicate the similarity of spectrum D6, and the parts marked with dots indicate the similarity of spectrum variation D10.

As can be understood from these diagrams, the similarity of spectrum variation which is a feature value for each of the utterances "iie" and "rei" with respect to the reference pattern for "iie" or "rei" is larger than the similarity of spectrum variation for the utterance of it with respect to the reference pattern for "rei" or "iie". As a result, even if there is no difference in the similarity of spectrum between the reference patterns and speech patterns for the utterances "iie" and "rei", using this together with the similarity of spectrum variation enables an accurate recognition to be performed.

Various modifications can be made to the embodiment described above. For instance, the functional steps for spectrum variation calculator 16 are by no means restricted to those in the embodiment. The operations performed by these functional means are also not restricted to those described for the embodiment.

Detailed descriptions of spectrum variation similarity calculator 18 and spectrum variation reference pattern memory 13 are omitted, but they can be constructed in a similar way to spectrum similarity calculator 13 and spectrum reference pattern memory 14.

Furthermore, the actions of the speech recognition system shown in FIG. 3 can be implemented by software built in a microcomputer or similar device with a structure using memory, a controller, other ordinary electronic circuits, etc.

As is clear from the descriptions above, the speech recognition system in this embodiment is constructed so as to perform recognition using similarity of normalized spectra and similarity of spectrum variations, and the direction of spectrum transition in input speech is taken into consideration in making the recognition. It has thus enabled accurate and stable recognition.

Figure 8:
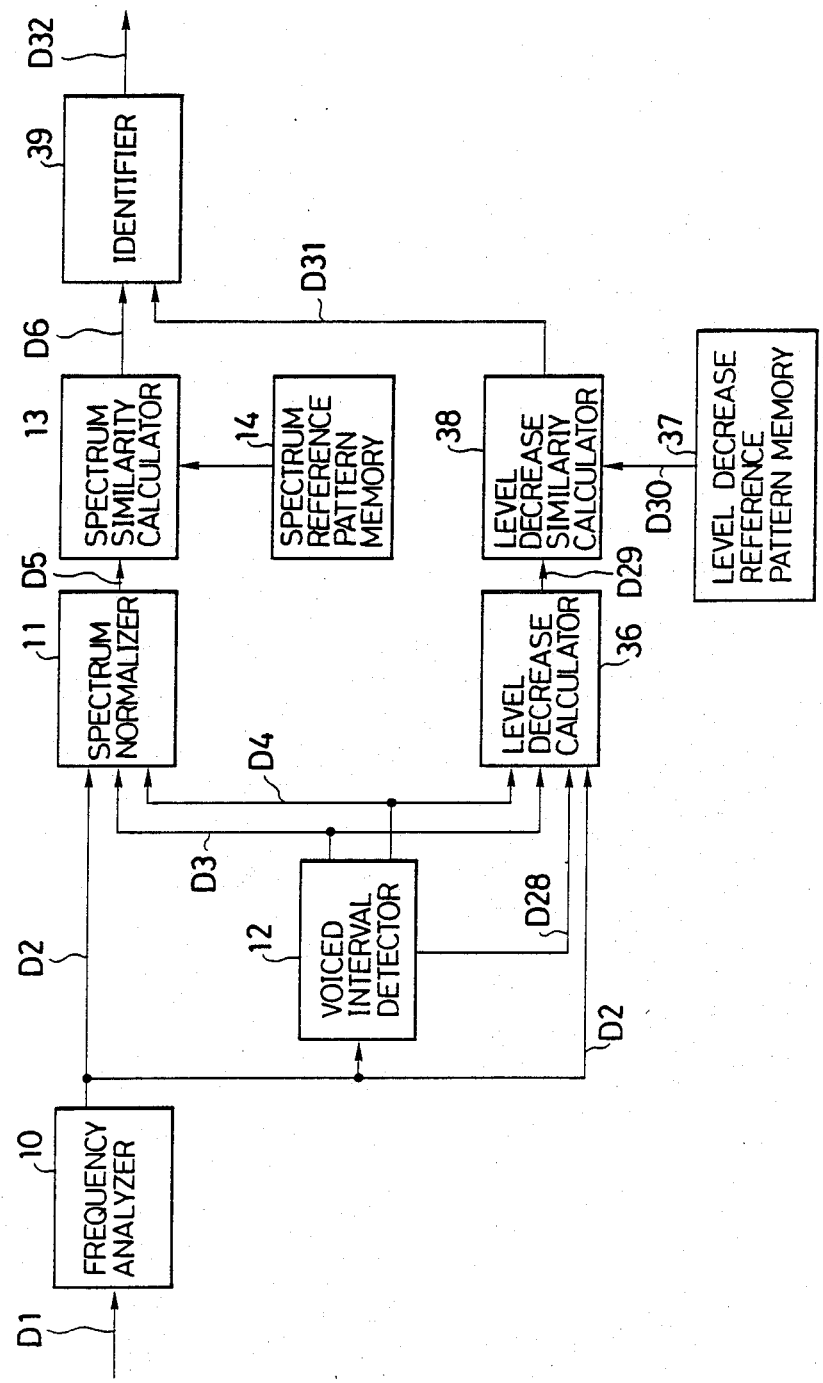
FIG. 8 is a block diagram showing a second embodiment of the invention.

FIG. 8 shows another embodiment of the invention. In this embodiment, level decrease is taken as the second feature value, and its similarity is taken into consideration in making the overall similarity calculation. In FIG. 8, the components having identical or similar functions to those in FIG. 1 and FIG. 3 are denoted by identical reference numerals.

The embodiment of FIG. 8 is characterized by a level decrease calculator 36 for extracting level information, particularly level decrease, which is a feature of the utterance, a level decrease reference pattern memory 37 for readably storing a level decrease reference pattern, and a level decrease similarity calculator 38 that calculates the similarity between the level decrease pattern and the level decrease reference pattern. The identifier 39 is capable of making recognition judgement based on the overall similarity.

Applied to the level decrease calculator 36 are start point signal D3, end point signal D4 and input speech level signal D28. Frequency spectrum D2 from the frequency analyzer 10 is also input to the level decrease calculator 36. The voiced interval detector 12 of this embodiment has an ordinary level extractor (not shown) to determine or calculate the input signal level of each frame (e.g., the sum of the absolute values of the outputs of the A/D converter over one frame) and produces the input speech level signal D28.

Figure 10:
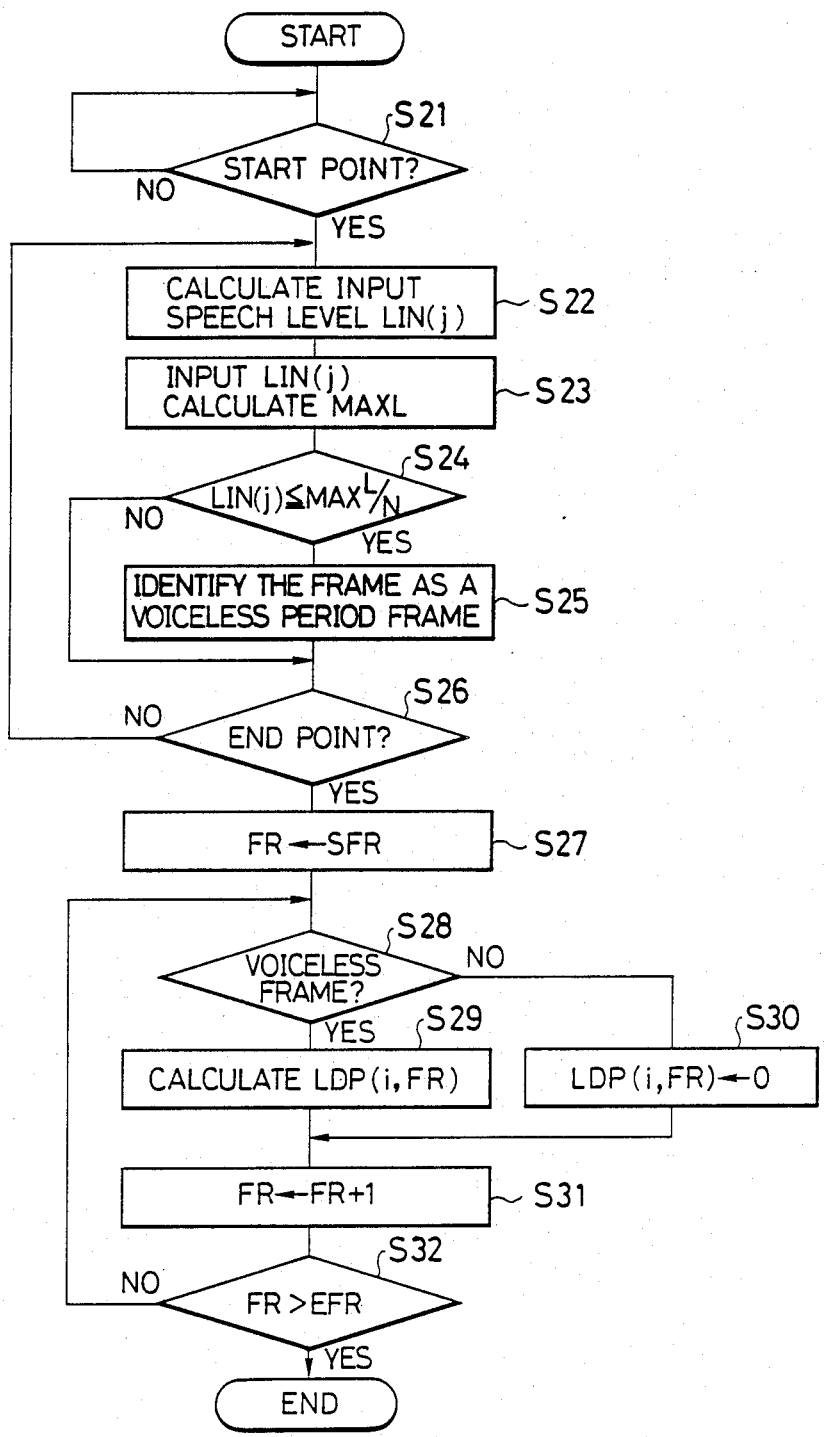
FIG. 10 is a flowchart showing the operations of the level decrease calculator 36 in FIG. 8.

The level decrease calculator 36 calculates the level decrease pattern D29 according to the procedure later described with reference to FIG. 10 and supplies it to the level decrease similarity calculator 38.

The level decrease similarity calculator 38 calculates the similarity between the level decrease pattern D29 and each of the level decrease reference patterns stored in the level decrease reference pattern memory 37 and supplies the identifier 39 with level decrease similarity D31 with respect to each recognition category.

The identifier 39 calculates the sum of the spectrum similarity D6 and the level decrease similarity D31 with respect to each of the recognition categories, and produces, as the recognition result D32, the name of the category with which the sum of the similarities is the greatest among all the recognition categories.

Figure 9:
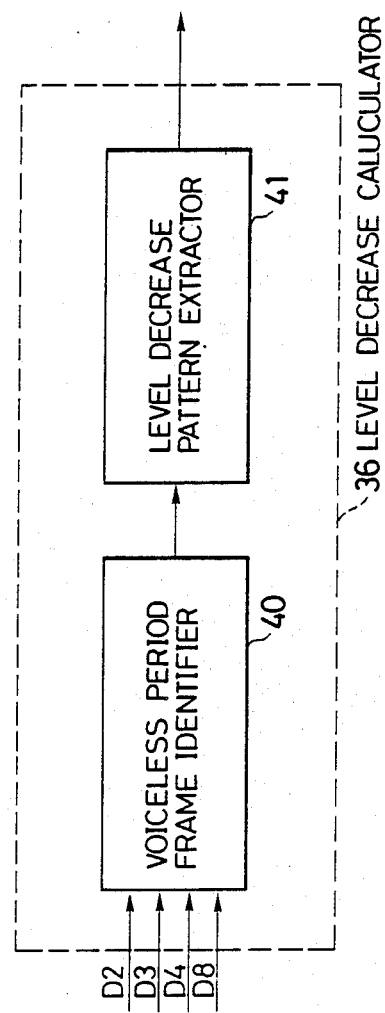
FIG. 9 is a block diagram showing an example of level decrease calculator 36 in FIG. 8.

Operations of the level decrease calculator 36 will now be described in detail with reference to the functional block diagram of FIG. 9 and the flowchart of FIG. 10. As shown in FIG. 9, the level decrease calculator 36 comprises a voiceless period frame identifier 40 and level decrease pattern extractor 41. The procedure followed by these components 40 and 41 will be explained with reference to FIG. 10.

(B-I) VOICELESS PERIOD FRAME IDENTIFIER (40 in FIG. 9)

At step S21 a judgment is made as to whether the start point signal D3 has been determined by the voiced interval detector 12, for each frame (the number of the frame under processing is identified by (j), and has been input. If it has been already input, the following processing is performed.

For each frame during speech input, the input speech level LIN(j) in the particular frame is calculated (S22) by the following equation:

$$LIN(j) = \sum_{i=1}^{CHNNO} SPEC(i,j)$$

where i denotes channel number,
  j denotes frame number, and
  CHNNO denotes the number of the channels.
Then the input speech level LIN(j) for the one frame is input and the maximum value MAXL of the input speech level LIN(j) among the frames ranging from the start point frame and the end point frame (S23) is identified by the following equation:

$$MAXL = \max_{K = SFR, EFR} \{LIN(k)\}$$

where SFR denotes the starting frame, and
  EFR denotes the ending frame.
Then a ratio MAXL/N, e.g., the maximum value divided by N, is determined and it is judged whether the input speech level LIN(j) at the particular frame satisfies the following condition (Step S24):

$$LIN(j) \leq MAXL/N$$

The value of N is a positive integer determined through experience and is normally about 2 or 3.

If this condition is satisfied, the frame in question is regarded as a voiceless frame (S25), after which the step S26 is performed. If the above condition is not satisfied, the step S25 is skipped.

At the step S26, a judgement is made as to whether the end point signal D4 indicating the end detection has been input from the voiced interval detector 12. If it has not been input, the procedure is returned to the step S22 to repeat the above-described process. When it has been input, the number of the end point frame EFR is made equal to "j" and the procedure goes to S27, where preparation of the level decrease pattern is started.

(B-II) LEVEL DECREASE PATTERN EXTRACTOR (41 in FIG. 9)

At the step S27, the frame number FR is initialized to be equal to the start point frame number SFR.

At the step S28, a judgement is made as to whether the frame FR has been recognized as a voiceless frame. The level decrease pattern LDP(i,FR) for each case is calculated in the following manner. Here, "i" represents the channel number.

(i) When the frame FR is recognized as a voiceless frame.

The level decrease pattern LDP(i,FR) is equal to the input speech level maximum value MAXL minus the frequency spectrum SPEC(i,FR) at the particular voiceless frame (identified by "FR") and the particular channel (identified by "i"), normalized or divided by the maximum value MAXL:

$$LDP(i,FR) = \{MAXL - SPEC(i,FR)\} / MAXL$$

As an alternative, a suitable constant C1 can be multiplied with the right side of the above equation to give the level decrease pattern LDP(i,FR). Here, C1 is an arbitary positive integer, whose value can be determined in accordance with the design.

From the above equation, the decrease relative to the maximum level of the frequency spectrum of the input voice at the particular voiceless frame and at the particular channel (S29) is determined.

(ii) When the frame FR is not is not recognized as a voiceless frame.

The level decrease pattern LDP(i,FR) is set at zero for each of the channels (S30):

$$LDP(i,FR) = 0$$

Next, the frame number FR is incremented by "1" (S31), and the new frame number FR is compared with the end point frame number EFR(S32):

$$FR > EFR$$

When this condition is not satisfied, the procedure is returned to the step S28 to repeat the process. When the above condition is satisfied, the preparation of the level decrease patterns is completed, and the level decrease pattern D29 is extracted.

Explanation of an example

Figure 11A:
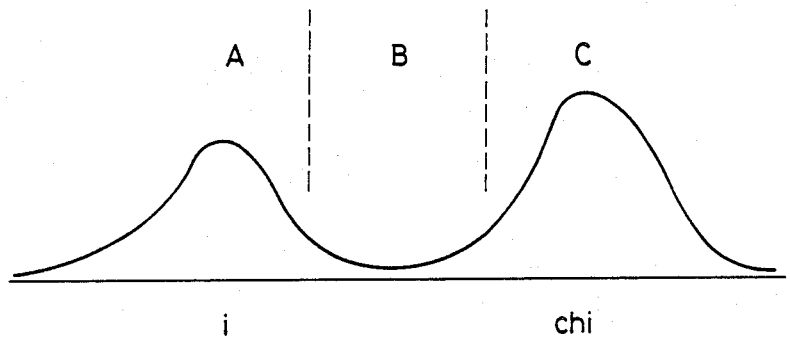
FIGS. 11A and 11B show level variations along the time axis for utterances of different words.
Figure 11B:
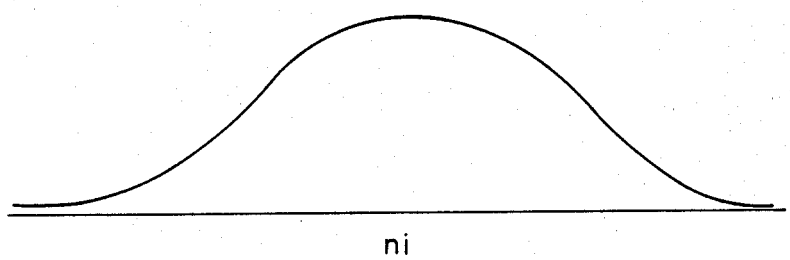

FIG. 11A and FIG. 11B show level variations along the time axis for utterance "i-chi" (a Japanese word meaning "one") and "ni" (a Japanese word meaning "two").

In FIG. 11A the region A corresponds to the syllable "i" of "i-chi", and the region C corresponds to the syllable "chi" of "i-chi". A region corresponding to "ni" is shown in FIG. 11B. These three regions have a high speech level and are not in a voiceless period. But, region B between "i" and "chi" in FIG. 11A is in the voiceless period. When the environmental noise spectrum in the region B has a high similarity with the spectrum of the vowel "i", of "ni", an identification judgement based solely on the spectrum similarity is difficult. According to the present embodiment, however, the level decrease similarity is clearly distinctive in the case of "i-chi" and "ni". Therefore, more accurate recognition can be accomplished by use of the level decrease similarity in addition to the frequency spectrum similarity.

Figure 12A:
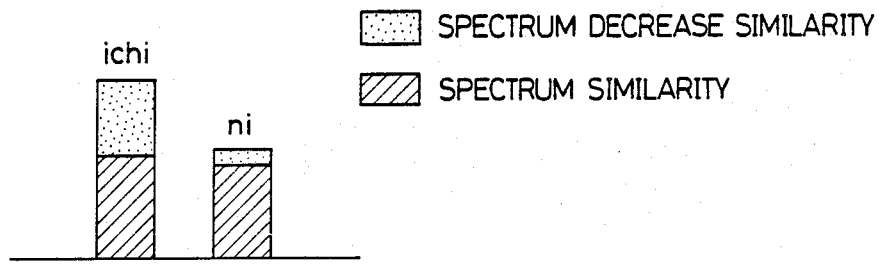
FIGS. 12A and 12B are explanatory diagrams of the overall similarity.
Figure 12B:
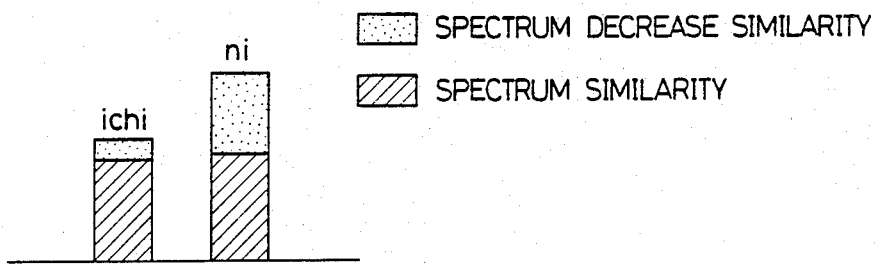

FIGS. 12A and 12B are explanatory diagrams of the overall similarity, which indicates the contribution of the level decrease patterns to recognition. FIG. 12A shows the overall similarity of the utterance "ichi", which has the speech pattern given in FIG. 11A, with respect to reference patterns of the categories "ichi" and "ni". FIG. 12B indicates the overall similarity of the utterance "ni", which has the speech pattern given in FIG. 11B, with respect to reference patterns of the categories "ichi" and "ni". In these diagrams, the parts marked with slanted lines indicate the similarity of spectrum D6, and the parts marked with dots indicate the similarity of level decrease D10. As can be understood from these diagrams, the similarity of level decrease which is a feature value for each of the utterances "ichi" and "ni" with respect to the reference pattern for "ichi" or "ni" is larger than the similarity of level decrease for the utterance of it with respect to the reference pattern for "ni" or "ichi". As a result, even if there is no difference in similarity of spectrum between the reference patterns and speech patterns for the utterances "ichi" and "ni", using this together with the similarity of level decrease enables an accurate recognition to be performed.

Various modifications to the above embodiment are possible. For instance, the functional steps for level decrease calculator 36 are by no means restricted to that in the embodiment. The sequence of actions performed by these functional means is also not restricted to those described for the embodiment.

Detailed descriptions of level decrease similarity calculator 38 and level decrease reference pattern memory 37 are omitted, but they can be constructed in a similar way to spectrum similarity calculator 13 and spectrum reference patter memory 14.

Furthermore, the actions of the speech recognition system shown in FIG. 8 can be implemented by software built in a microcomputer or similar device with a structure using memory, a controller, other ordinary electronic circuits etc.

As is clear from the descriptions above, the speech recognition system in this the above embodiment is constructed so as to perform recognition using similarity of normalized spectra and similarity of level decrease and level information is thereby taken into consideration in making the speech recognition. It has enabled accurate and stable recognition.

FIG. 13 shows a further embodiment of the invention. In this embodiment, the relative value of the normalized spectrum in the same voiced interval is taken as the second feature value and its similarity is taken into consideration in making the overall similarity calculation. In FIG. 13, the components having identical or similar functions to those in FIG. 1 and FIG. 3 are denoted by identical reference numerals.

The embodiment of FIG. 13 is characterized by a spectrum relative value calculator 56 for exctracting a spectrum relative value which is a feature of the utterance, a spectrum reference pattern memory 57 in which spectrum relative value patterns are readably stored, and a spectrum relative value calculator 58 for calculating the similarity between the spectrum relative value pattern and the spectrum relative value reference patterns.

Applied to the spectrum relative value calculator 56 are start point signal D3 and end point signal D4 from the voiced interval detector 12, and normalized spectrum pattern D5 from the spectrum normalizer 11.

Figure 15:
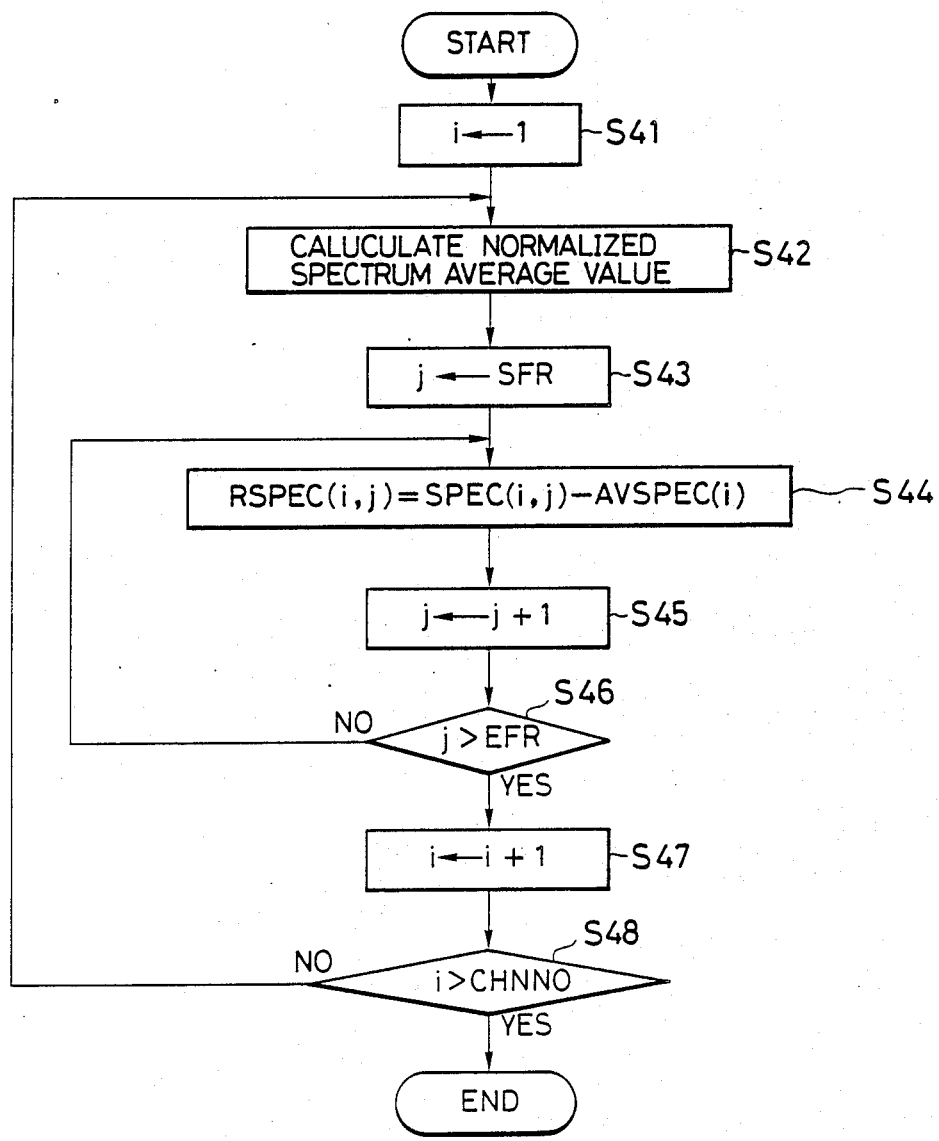
FIG. 15 is a flowchart showing the operations of the spectrum relative value calculator 56 in FIG. 13.

The spectrum relative value calculator 56 calculates spectrum relative value pattern D58 in a manner later described with reference to FIG. 15. The spectrum relative value pattern D58 is supplied to the spectrum relative value similarity calculator 58.

The spectrum relative value similarity calculator 58 calculates the similarity between the spectrum relative value pattern D58 and each of the spectrum relative value reference patterns D59 that are stored in the spectrum relative value reference pattern memory 57 and outputs the spectrum relative value similarity D60 for each recognition category to the identifier 19.

The identifier 19 references, for each recognition category, the spectrum similarity D6, and the spectrum relative value similarity D60 and outputs, as the recognition result, the category which gives the maximum overall similarity. In the embodiment illustrated, the identifier 19 determines the sum of the spectrum similarity D6 and the spectrum relative value similarity D60, and outputs, as the recognition result D11, the category name which gives the maximum sum among all the categories.

The operations of the spectrum relative value calculator 56 will be described in detail with reference to the functional block diagram of FIG. 14 and the flowchart of FIG. 15.

Figure 14:
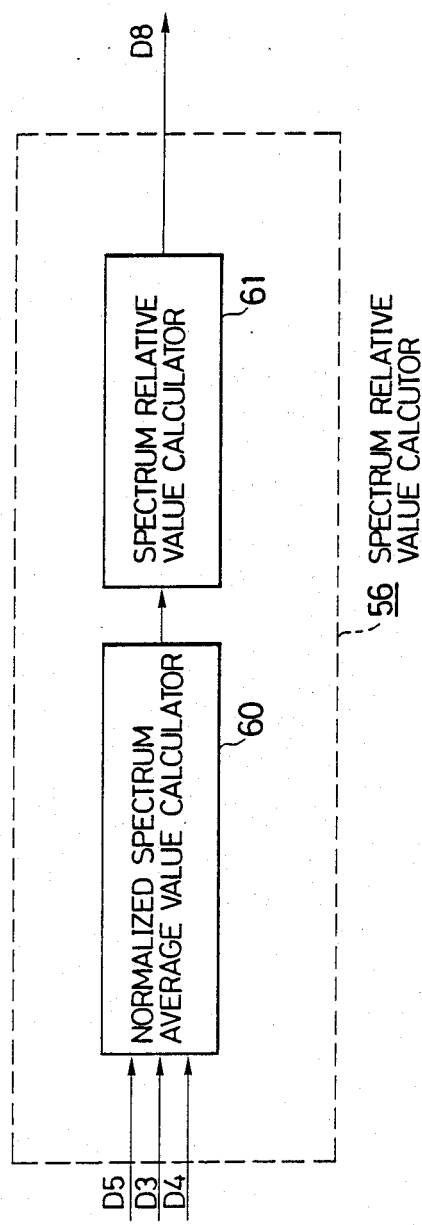
FIG. 14 is a functional block diagram showing an example of spectrum relative value calculator 56 in FIG. 13.

As shown in FIG. 14, the spectrum relative value calculator 56 comprises a normalized spectrum average value calculator 60 and a spectrum relative value calculator 61. The operations of these components 60 and 61 will be described with reference to FIG. 15. In the following description, the process steps are denoted by "S".

In the following description, the frequency analysis band number (channel number) is represented by CHNNO, the speech start point frame number is represented by SFR, the speech end point frame number is represented by EFR, the normalized spectrum is represented by SPEC(i,j) (i represents the channel number and j represents the frame number), and the spectrum relative value is represented by RSPEC (i,j) (i represents the channel number and j represents the frame number).

(C-I) NORMALIZED SPECTRUM AVERAGE VALUE CALCULATOR 60

First, the number of the channel on which the spectrum relative value is calculated is set at "1" (S 41).

This is done for each normalized spectrum of each frame that is input.

Next, the normalized spectrum average value is calculated (S 42).

The normalized spectrum average value of channel i is calculated by the following equation (5):

$$AVSPEC(i) = \left( \sum_{j=SFR}^{EFR} SPEC(i,j) \right) / (EFR - SFR + 1) \quad (5)$$

This can be accomplished by calculating $$\sum_{j=SFR}^{EFR} SPEC(i,j), \quad \text{and}$$

$$(EFR - SFR + 1), \quad \text{and}$$

dividing the former by the latter. Alternatively, a table RAM, or the like, can be used for the calculation.

(C-II) SPECTRUM RELATIVE VALUE CALCULATOR 61

First, the number of the frame on which the spectrum relative value is calculated is set at "SFR" (S 43).

Next, the spectrum relative value at the particular channel and at the particular frame is calculated by the following equation (S 44).

$$RSPEC(i,j) = SPEC(i,j) - AVSPEC(i) \quad (6)$$

Next, the frame number is incremented by "1" (S 45), and it is checked whether the frame number is larger than the speech end point frame number EFR (S 46), i.e., whether $$j > EFR \text{ (EFR: speech end point frame number)}$$

If the above condition is not satisfied, the steps S44 and S45 are repeated for the remaining frames and for the same channel number. If this condition is satisfied the calculation of the spectrum relative value of the particular channel is terminated.

Next, the channel number i is incremented by "1" (S 47) and it is checked whether $$i > CHNNO \text{ (CHNNO: channel number)}$$

(S 48). If this condition is not satisfied, the steps S42 to S47 are repeated for the remaining channel numbers that have not been processed. If this condition is satisfied, the calculation of the spectrum relative value for the input speech is terminated.

Explanation of an example

Figure 16A:
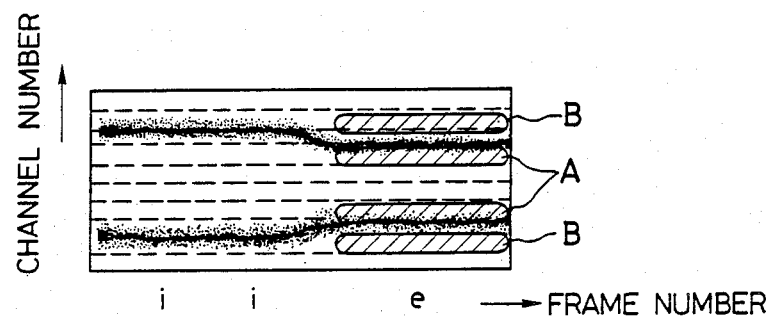
FIGS. 16A and 16B show normalized spectra for utterances of different words.
Figure 16B:
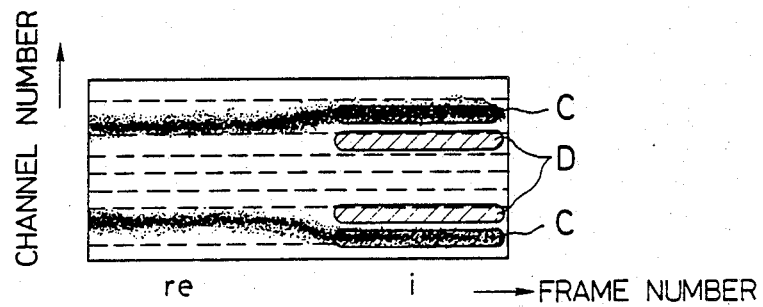

FIG. 16A shows the normalized spectrum for the utterance "iie", and FIG. 16B shows the normalized spectrum for the utterance "rei". The horizontal axis represents the frame number and the vertical axis represents the channel number. Parts where the shading is dense represent a high normalized output value. The stronger the spectrum, the denser the shading. When there is dense shading at both the top and bottom, this is because both the top and bottom parts of the spectrum (high frequency part, low frequency part) are strong.

In the case of the normalized spectrum shown in these figures, the spectrum relative value is large in the hatched region A in FIG. 16A and is small in the hatched region B. In FIG. 16B, the spectrum relative value is large in the hatched region C, and is small in the hatched region D. Consequently, the similarity of spectrum variation D60, which is the similarity between the spectrum relative value pattern D58 output from the spectrum relative value calculator 56 and the spectrum relative value reference pattern D59, shows a clear difference between "iie" and "rei".

Figure 17A:
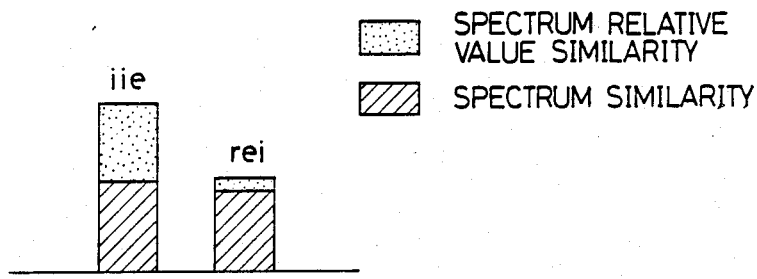
FIGS. 17A and 17B are explanatory diagrams of the overall similarity.
Figure 17B:
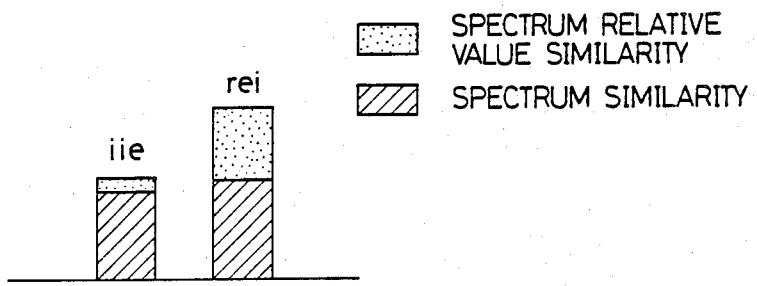

FIGS. 17A and 17B are explanatory diagrams of the overall similarity, which indicates the contribution of the spectrum relative value patterns to recognition. FIG. 17A shows the overall similarity of the utterance "iie", which has the speech pattern given in FIG. 16A, with respect to categories "iie" and "rei". FIG. 17B indicates the overall similarity of the utterance "rei", which has the speech pattern given in FIG. 16B, with respect to categories "iie" and "rei". In these diagrams, the parts marked with slanted lines indicate the similarity of spectrum D6, and the parts marked with dots indicate the similarity of spectrum relative value D60.

As can be understood from these diagrams, the similarity of the spectrum relative value which is a feature value for each of the utterances "iie" and "rei" with respect to the reference pattern for "iie" or "rei" is larger than the similarity of spectrum relative value for the utterance of it with respect to the reference pattern for "rei" or "iie". As a result, even if there is no difference in similarity of spectrum between the reference patterns and speech patterns for the utterances "iie" and "rei", using this together with the similarity of spectrum relative value enables an accurate recognition process to be performed.

Various modifications to the above embodiment are possible. For instance, the functional steps for spectrum relative value calculator 56 are by no means restricted to those in the embodiment. The sequence of actions performed by these functional means is also not restricted to those described for the embodiment.

Detailed descriptions of spectrum relative value similarity calculator 58 and spectrum relative value reference pattern memory 57 are omitted, but they can be constructed in a similar way to spectrum similarity calculator 13 and spectrum reference pattern memory 14.

Furthermore, the actions of the speech recognition system shown in FIG. 13 can be implemented by software built in a microcomputer or similar device with a structure using memory, a controller, other ordinary electronic circuits etc.

As is clear from the descriptions above, the speech recognition system in this embodiment is constructed so as to perform recognition using similarity of normalized spectra and similarity of spectrum relative values, and the spectrum relative value is thereby taken into consideration in making the speech recognition. It has thus enabled accurate and stable recognition.

What is claimed is:

1. A speech recognition system comprising
   a frequency analyzer which performs frequency analysis of the input speech into a number of channels, performs logarithmic conversion and extracts a frequency spectrum,
   a voiced interval detector which detects voiced intervals on the basis of the said frequency spectrum,
   a spectrum normalizer which determines a least square fit line for the frequency spectrum and normalizes the frequency spectrum with reference to the least square fit line to provide a normalized frequency spectrum pattern,
   a spectrum reference pattern memory in which spectrum reference patterns are stored in advance,
   a spectrum similarity calculator which calculates the similarity between the said normalized spectrum pattern and a spectrum reference pattern for each of a plurality of recognition categories, and
   an identifier which, as the result of the spectrum similarity calculation, outputs the name of the recognition category which has the highest similarity,
   the speech recognition system further comprising:
   (a) a second feature pattern calculator which calculates a second feature pattern, said second feature pattern calculator (a) including a spectrum variation pattern calculator which, for each frame in a voiced interval, calculates for each channel, as the second feature pattern, a spectrum variation pattern which quantifies the degree and the direction of the transition between channels of the normalized spectrum with the advance of time around the said frame, and
   (b) a second feature reference pattern memory in which second feature reference patterns have previously been stored, said second feature reference pattern memory (b) including a spectrum variation reference pattern memory in which spectrum variation reference patterns, as said second feature reference patterns, have previously been stored, and
   (c) a second feature similarity calculator which calculates the similarity between the said second feature pattern and the second feature reference patterns with respect to each recognition category, said second feature similarity calculator (c) including a spectrum variation similarity calculator which calculates the similarity between the said spectrum variation pattern and the spectrum variation reference patterns with respect to each of the recognition categories, and in that
   (d) in the identifier, the overall similarity is calculated for each of the recognition categories by reference to both the similarity of the spectrum and the similarity of the second feature, and the category giving the largest overall similarity is output as the recognition result.

2. A speech recognition system according to claim 1, wherein the said spectrum variation similarity calculator comprises
   (c1) means for calculating the interframe distance in which, for each frame of a voiced interval, the distance between the said frame and the frame preceding the said frame is calculated,
   (c2) means for determining a maximum variation frame in which a frame is determined to be a maximum variation fame if the interframe distance within a voiced interval is, in the said calculation, found to be maximum, and
   (c3) means for extracting spectrum variation patterns in which, for a frame which has been determined to be the said maximum variation frame, the normalized spectrum values are calculated in each of four regions for each channel in the said frame, namely,
   (c31) a region where the frame number is on the negative side with respect to the said frame and the channel number is on the negative side with respect to the said channel,
   (c32) a region where the frame number is on the positive side with respect to the said frame and, the channel number is on the positive side with respect to the said channel,
   (c33) a region where the frame number is on the negative side with respect to the said frame and in which the channel number is on the positive side with respect to the said channel, (c34) a region where the frame number is on the positive side with respect to the said frame and in which the channel number is on the negative side with respect to the said channel, and values showing relationships between the normalized spectrum values in the regions (c31) and (c32), and the normalized spectrum values in the regions (c33) and (c34) are taken to be the spectrum variation pattern for the said frame and said channel, and the values for the spectrum variation pattern for frames which were not determined to be the said maximum variation frame are taken to be 0 for every channel.

3. A speech recognition system according to claim 1, wherein the overall similarity is calculated by adding the similarity for the spectrum and the similarity for the second feature.

4. A speech recognition system comprising a frequency analyzer which performs frequency analysis of the input speech into a number of channels, performs logarithmic conversion and extracts a frequency spectrum, a voiced interval detector which detects voiced intervals on the basis of the said frequency spectrum, a spectrum normalizer which determines a least square fit line for the frequency spectrum and normalizes the frequency spectrum with reference to the least square fit line to provide a normalized frequency spectrum pattern, a spectrum reference pattern memory in which spectrum reference patterns are stored in advance, a spectrum similarity calculator which calculates the similarity between the said normalized spectrum pattern and a spectrum reference pattern for each of a plurality of recognition categories, and an identifier which, as the result of the spectrum similarity calculation, outputs the name of the recognition category which has the highest similarity, the speech recognition system further comprising:

(a) a second feature pattern calculator which calculates a second feature pattern, said second feature pattern calculator (a) including a level decrease pattern calculator which, for each frame in a voiced interval, determines whether the particular frame is a voiceless frame in accordance with the level of input speech for the frame with respect to the maximum value of the input speech level, and calculates, as said second feature pattern, a level decrease pattern for the voiceless frame which quantizes the level decrease relative to the maximum value of the input speech level in the particular voiceless frame, (b) a second feature reference pattern memory in which second feature reference patterns have previously been stored, said second feature reference pattern memory (b) including a level decrease reference pattern memory in which level decrease reference patterns have previously been stored, and (c) a second feature similarity calculator which calculates the similarity between the said second feature pattern and the second feature reference patterns with respect to each recognition category, said second feature similarity calculator (c) including a level decrease similarity calculator which calculates the similarity between the said level decrease pattern and the level decrease reference patterns with respect to each of the recognition categories, and in that (d) in the identifier, the overall similarity is calculated for each of the recognition categories by reference to both the similarity of the spectrum and the similarity of the second feature, and the category giving the largest overall similarity is output as the recognition result.

5. A speech recognition system according to claim 4, wherein said level decrease pattern calculator comprises a voiced interval frame identifier which calculates, for each of the frames during speech input, the input speech level in the particular frame, and repeatedly performs, from the speech start point frame to the speech end point frame, the process of identifying the frame in question to be a voiceless frame if the input speech level is not more than $1/N$ of the input speech level maximum value among the frames from the speech start point frame to the frame in question, N being a predetermined positive integer, and a level decrease pattern extractor taking, after detecting the speech end point, for each voiceless frame and for each channel, a value obtained by normalizing, by the input speech level maximum value, a value that in turn is obtained by subtracting, from the said input speech level maximum value, the frequency spectrum value at the voiceless frame and at the particular channel, to be the level decrease at the particular voiceless frame and at the particular channel, and for each frame that has not been identified to be a voiceless frame, "0" to be the level decrease at all the channels and at the particular frame.

6. A speech recognition system according to claim 4, wherein the overall similarity is calculated by adding the similarity for the spectrum and the similarity for the second feature.

7. A speech recognition system comprising a frequency analyzer which performs frequency analysis of the input speech into a number of channels, performs logarithmic conversion and extracts a frequency spectrum, a voiced interval detector which detects voiced intervals on the basis of the said frequency spectrum, a spectrum normalizer which determines a least square fit line for the frequency spectrum and normalizes the frequency spectrum with reference to the least square fit line to provide a normalized frequency spectrum pattern, a spectrum reference pattern memory in which spectrum reference patterns are stored in advance, a spectrum similarity calculator which calculates the similarity between the said normalized spectrum pattern and a spectrum reference pattern for each of a plurality of recognition categories, and an identifier which, as the result of the spectrum similarity calculation, outputs the name of the recognition category which has the highest similarity, the speech recognition system further comprising:

(a) a second feature pattern calculator which calculates a second feature pattern, said second feature pattern calculator (a) including a spectrum relative value calculator which, for each channel, calculates as the spectrum relative value pattern, the relative value of the normalized spectrum in a voiced interval with respect to a normalized spectrum average value in each frame, (b) a second feature reference pattern memory in which second feature reference patterns have previously been stored, said second feature reference pattern memory (b) including a spectrum relative value reference pattern memory storing spectrum relative value reference patterns, and (c) a second feature similarity calculator which calculates the similarity between the said second feature pattern and the second feature reference patterns with respect to each recognition category, said second variable similarity calculator (c) including a spectrum relative value similarity calculator which calculates the similarity between the spectrum relative value pattern and the spectrum relative value reference patterns for each of the recognition categories, and in that (d) in the identifier, the overall similarity is calculated for each of the recognition categories by reference to both the similarity of the spectrum and the similarity of the second feature, and the category giving the largest overall similarity is output as the recognition result.

8. A speech recognition system according to claim 7, wherein the said spectrum relative value calculator comprises means for calculating the normalized spectrum average value from the speech start point frame to the speech end point frame at every channel, and means for calculating the spectrum relative value by subtracting the normalized spectrum average value from the normalized spectrum for the particular channel, for all the frames from the speech start point frame to the speech end point frame, wherein the spectrum relative value pattern is obtained by determining the spectrum average value for all the channels that have been frequency-analyzed.

9. A speech recognition system according to claim 7, wherein the overall similarity is calculated by adding the similarity for the spectrum and the similarity for the second feature.

* * * * *